United States Patent
Yanoff et al.

(10) Patent No.: US 7,208,739 B1
(45) Date of Patent: Apr. 24, 2007

(54) METHOD AND APPARATUS FOR CORRECTION OF PILEUP AND CHARGE SHARING IN X-RAY IMAGES WITH ENERGY RESOLUTION

(75) Inventors: Brian David Yanoff, Niskayuna, NY (US); Wen Li, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 11/290,007

(22) Filed: Nov. 30, 2005

(51) Int. Cl.
*G01T 1/164* (2006.01)
*G02F 1/035* (2006.01)

(52) U.S. Cl. .............................................. 250/363.09
(58) Field of Classification Search .......... 250/363.09, 250/363.02
See application file for complete search history.

(56) References Cited

U.S. PATENT DOCUMENTS

| 4,316,257 A * | 2/1982 | Del Medico et al. ... 250/363.01 |
| 5,155,365 A * | 10/1992 | Cann et al. ............. 250/363.02 |
| 6,438,210 B1 | 8/2002 | Castleberry |
| 6,560,308 B1 * | 5/2003 | Zmora ......................... 378/4 |
| 6,594,342 B2 | 7/2003 | Castleberry |
| 6,611,575 B1 | 8/2003 | Alyassin et al. |
| 6,683,934 B1 | 1/2004 | Zhao et al. |
| 6,707,878 B2 | 3/2004 | Claus et al. |
| 6,724,856 B2 | 4/2004 | De Man et al. |
| 6,740,885 B2 | 5/2004 | Wainer et al. |
| 6,748,047 B2 | 6/2004 | Gonzalez Trotter et al. |
| 6,856,350 B2 | 2/2005 | Orava et al. |
| 6,882,700 B2 | 4/2005 | Wang et al. |
| 6,901,337 B2 * | 5/2005 | Tanaka et al. ................. 702/60 |
| 2002/0121603 A1 * | 9/2002 | Wong et al. ........... 250/363.09 |
| 2003/0033097 A1 * | 2/2003 | Tanaka et al. ................. 702/60 |
| 2003/0164888 A1 | 9/2003 | Orava et al. |
| 2003/0173522 A1 | 9/2003 | Spartiotis |
| 2003/0194050 A1 | 10/2003 | Eberhard et al. |
| 2003/0194121 A1 | 10/2003 | Eberhard et al. |
| 2004/0036025 A1 * | 2/2004 | Wong et al. ........... 250/363.09 |
| 2004/0096031 A1 | 5/2004 | Caria et al. |
| 2005/0226371 A1 | 10/2005 | Kautzer et al. |

FOREIGN PATENT DOCUMENTS

| EP | 0 417 965 A2 | 9/1990 |
| EP | 0 426 285 A1 | 9/1990 |

* cited by examiner

*Primary Examiner*—Otilia Gabor
(74) *Attorney, Agent, or Firm*—Jean K. Testa; Curtis B. Brueske

(57) ABSTRACT

A method for correcting at least one of pileup effects or charge sharing effects in multi-cell photon counting detectors includes determining a correction coefficient using a count rate of an entire spectrum and applying the determined correction to the counts recorded in an energy window of interest.

18 Claims, 8 Drawing Sheets

METHOD AND APPARATUS FOR CORRECTION OF PILEUP AND CHARGE SHARING IN X-RAY IMAGES WITH ENERGY RESOLUTION

BACKGROUND OF THE INVENTION

This invention relates generally to x-ray image processing techniques, and more particularly to methods and apparatus to correct distortion in pixellated x-ray imaging detectors with energy resolution.

A pixellated x-ray detector with energy resolution can be made using semiconductor materials that directly convert x-rays into electron-hole pairs. Two effects distort x-ray spectra that can be measured by a pixilated x-ray detector. One is pileup of x-ray events resulting from the inherent statistical nature of the counting process. A second is sharing of charge between adjacent pixels due to the finite size of the charge cloud generated by the x-ray beam. The size of this charge cloud is dependent upon the diffusion of charge carriers outward from the x-ray interaction site, and also depends on the time allowed for diffusion to take place. This time, in turn, is dependent upon the distance from the interaction site to the collecting electrode. In this way, charge sharing is dependent upon detector thickness.

Some applications such as mammography require high spatial resolution and thus, small pixel sizes. However, the size of the charge cloud can be comparable to the size of the required small pixels. Simulations of a 100 micron pixel and 0.5 mm thickness detector show that 70% of x-ray events are subject to some degree of charge sharing.

The nature of the x-ray spectrum distortion resulting from charge sharing can be quantified. Depending upon the manner in which pileup is handled by the electronics of an x-ray imager, pileup can either cause events to be counted together that should instead be counted separately (thereby resulting in higher energy events occurring in a collected spectrum) or cause a loss of a second event that occurs within the dead time of the detector. Charge sharing creates the appearance of additional low energy events because the energy of a single x-ray gets divided between more than one pixel, effectively adding counts to the low end of the energy spectrum and removing counts from the high end.

BRIEF DESCRIPTION OF THE INVENTION

One aspect of the present invention therefore provides a method for correcting at least one of pileup effects or charge sharing effects in multi-cell photon counting detectors. The method includes determining a correction coefficient using a count rate of an entire spectrum and applying the determined correction to the counts recorded in an energy window of interest.

Another aspect of the present invention provides an apparatus for correcting at least one of pileup effects or charge sharing effects in multi-cell photon counting detectors. The apparatus is configured to determine a correction coefficient using a count rate of an entire spectrum, and to apply the determined correction to the counts recorded in an energy window of interest.

It will be appreciated that configurations of the present invention reduce distortion of x-ray images resulting from either or both of pileup effects or charge sharing effects.

DETAILED DESCRIPTION OF THE INVENTION

In some configurations of the present invention, sequential processing steps are used to correct for a pileup of x-rays resulting from inherent Poisson statistics followed by a correction for a sharing of charge between adjacent pixels in an x-ray image containing spectral content. These corrections are usefully applied to x-ray images obtained using, for example, a direct conversion detector with energy resolution. A technical effects achieved by various configurations of the present invention is the generation of an improved resolution x-ray image, or equivalently, electronic data representing such an improved image that can be interpreted as such by a computer or processor and displayed on a suitable display device.

Thus, in some configurations of the present invention, a method for correcting at least one of pileup effects or charge sharing effects in multi-cell photon counting detectors includes setting an energy threshold at a level that rejects counts from adjacent cells. In this manner, charge sharing effects are reduced. In some of these configurations, the method is performed using a mammography imaging apparatus to image a human breast.

More particularly, in photon-counting systems for mammography, count loss in detectors results in both a reduced detector signal to noise ratio (which cannot be recovered) and a loss of linearity. A correction method is described below to correct for the loss of linearity. Also, a spectrum distortion results in a difficulty in discriminating different energies. A reconstruction method is described below to compensate for this distortion.

Figure 3:
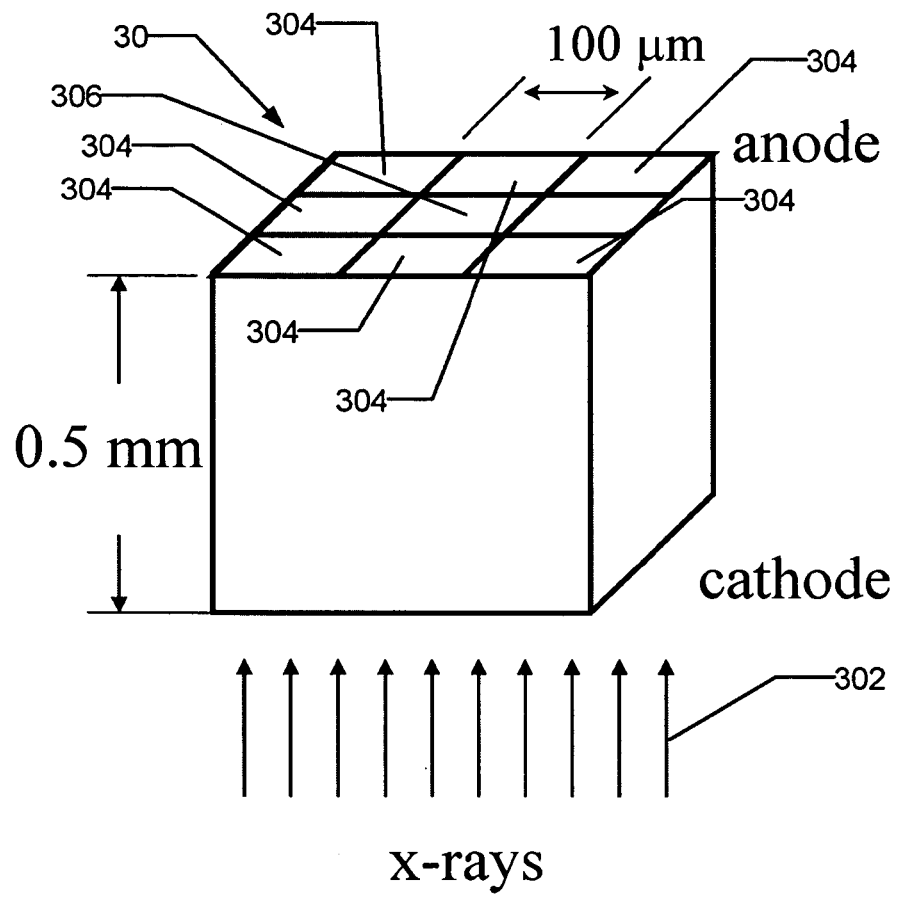
FIG. 3 is a drawing representative of a pixellated detector array.

Referring to FIG. 3, x-rays 302 passing through a object to be imaged (not shown in FIG. 3) strike an x-ray detector 30 comprising a plurality of pixels 304. A simple simulation of statistical pileup and charge sharing has been performed in which the energy, timing, and interaction location of each photon was randomly sampled. The electron distribution in the simulation was determined by photoelectric electron range and diffusion. A 100 ns constant electronic dead time was assumed, and analysis was focused on central pixel 306.

Figure 4:
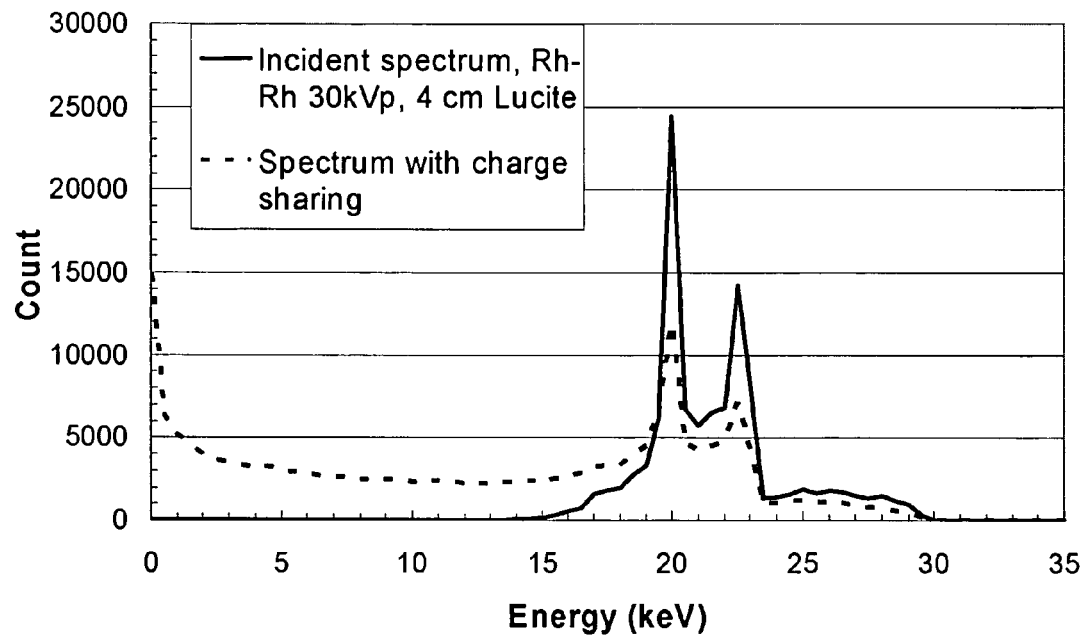
FIG. 4 is a graph showing the effect of charge sharing on the spectrum of the detector array of FIG. 3.

The effect of charge sharing on a received spectrum determined from the simulation is shown in the graph in FIG. 4. It was determined that about 70% of interaction events have charge sharing, and about 40% of the recorded counts were from adjacent pixels.

Figure 5:
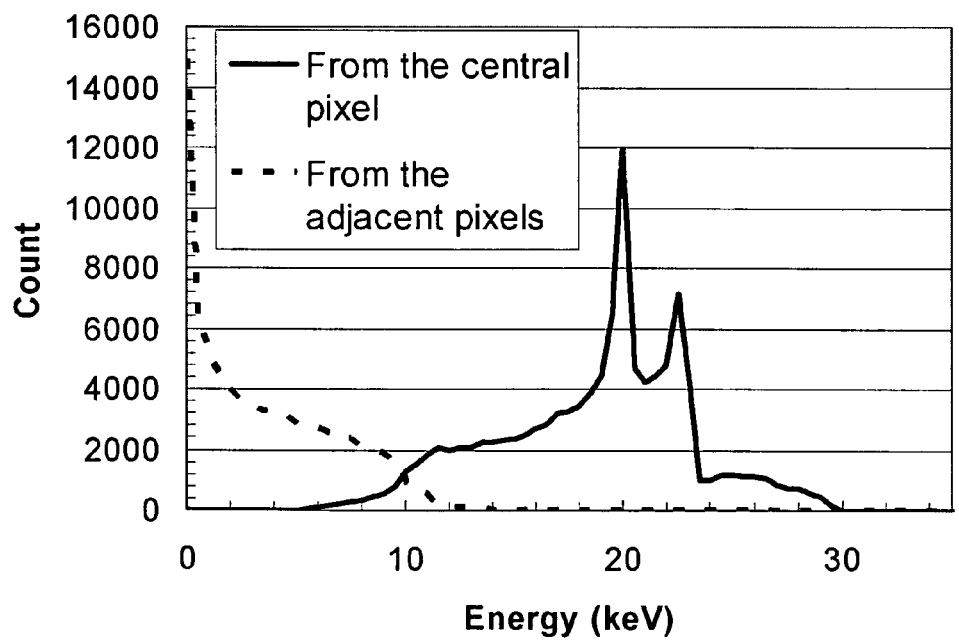
FIG. 5 a graph showing charge sharing as total counts as a function of energy for the central pixel and the adjacent pixels of the array of FIG. 3.
Figure 6:
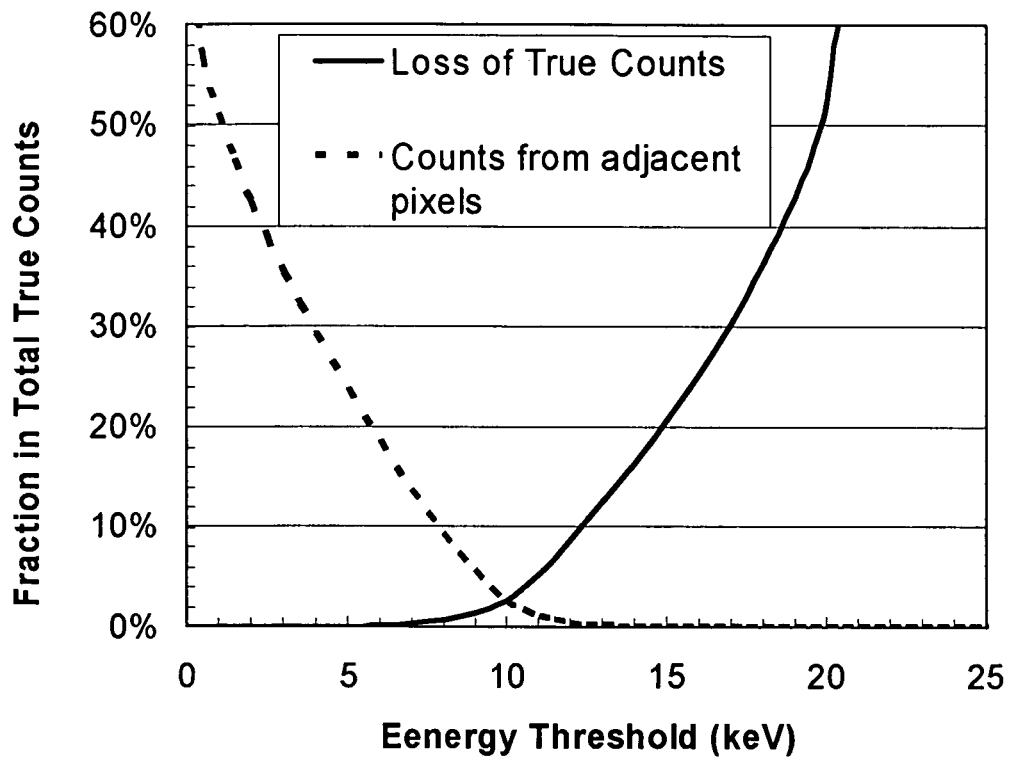
FIG. 6 is a graph showing the loss of true counts vs. the counts from adjacent pixels included as a function of energy threshold for the graph of FIG. 5.

To separate the spectrum recorded with charge sharing, counts from the central pixel should be kept, while counts from adjacent pixels should be rejected. In practice, overlapping of the two contributions is unavoidable, so there is a tradeoff in selecting an energy threshold. However, for simple photon counting, the graphs of FIGS. 5 and 6 indicate that 10 keV is a good choice. This threshold is derived from these Figures and may be different in other cases and/or in other devices besides a mammography imaging apparatus.

Figure 7:
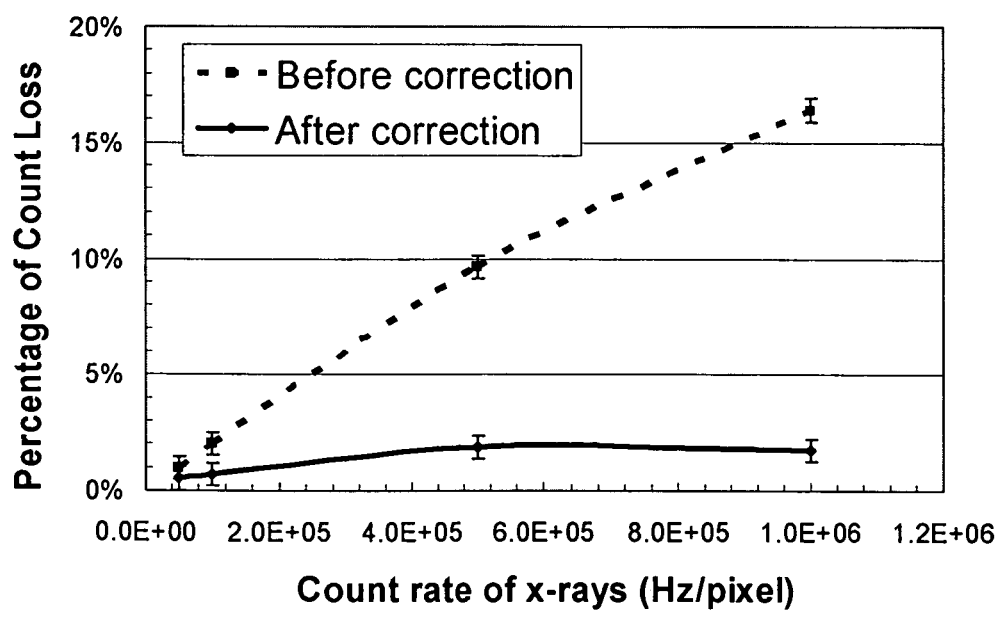
FIG. 7 is a graph showing the effect of statistical pileup in a first case without distortion.
Figure 8:
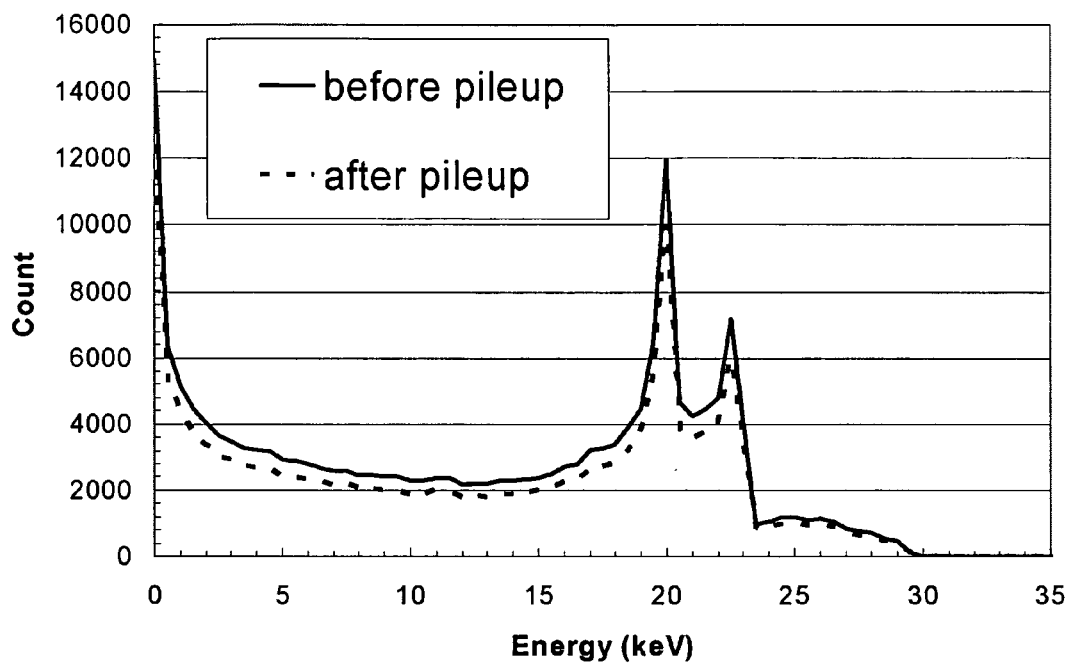
FIG. 8 is a graph showing the effect of peak-pileup in a second case with distortion.

The effects of statistical pileup are shown in the graphs of FIGS. 7 and 8. For these figures, a 1 MHz/pixel count rate of x-rays was assumed at a constant dead time of 110 ns. FIG. 7 shows a first case of statistical pileup, with about 18% count loss and no distortion. FIG. 8 shows a second case of peak-pileup, with about 18% count loss with distortion. FIGS. 7 and 8 indicate that there is additional count loss in pileup as a result of charge sharing from adjacent pixels.

Mathematical Description about Statistical Pileup & Charge Sharing:

For an incident spectrum $f_0(E_i)$, charge sharing results in a spectrum written as $f_1(E_i) = f_0(E_j) \cdot H(E_j, E_i) + g(E_i)$, where $g(E_i)$ represents the signal in the pixel that leaks in as a result of charge sharing from adjacent pixels. Thus, $H(E_j, E_i)$ represents the signal leaking out of the pixel. The function $g(E_i)$ also includes the electronic noise contribution.

In the first case of pileup described above, this spectrum is transformed into a modified spectrum written in the form:

$$f_2(E_i) = \frac{1}{1 + n\tau} f_1(E_i).$$

In the second pileup case described above, the function is instead transformed into a modified spectrum written as $f_2(E_i)$=Function of n, $f_1(E_i)$, waveform.

Figure 9:
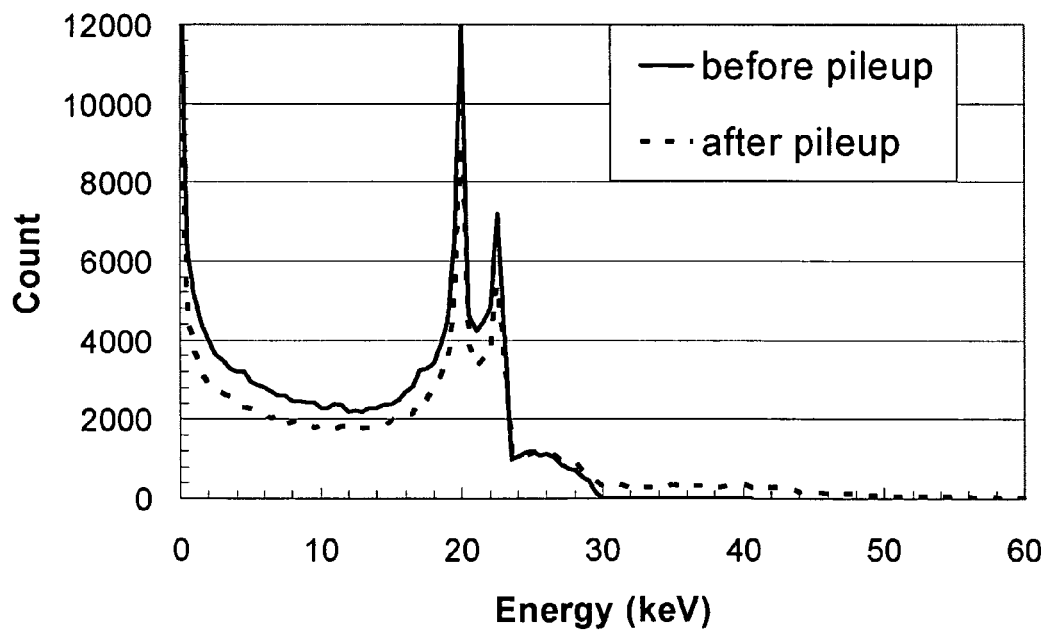
FIG. 9 is a graph showing results of a correction for statistical pileup and charge sharing, with a system dead time of 110 ns and pileup case 1, using 10 keV as a threshold.

To correct for statistical pileup and charge sharing in simple photon counting, two different methods can be used. The first method involves calibration with different signal count rates. More particularly, the energy threshold is set to reject counts from adjacent pixels. The second method uses an analytical correction, which turns out to be quite simple for case 1. Specifically, a correction coefficient is calculated using the count rate of the whole spectrum, and the correction is applied to the counts recorded in the energy window of interest. An example of the application of method 2 is shown in the graph of FIG. 9, with a system dead time of 110 ns in the first pileup case, using a 10 keV threshold.

A post measurement reconstruction is used in some configurations of the present invention for energy discrimination. This method involves correcting for statistical pileup, and reconstructing the spectrum to correct for charge sharing using the detector response function. The detector response function $H(E_j, E_i)$ can be directly measured using a monoenergetic beam of photons, or it can be modeled using the response of the detector. Some configurations combine modeling with direct measurement.

Figure 10:
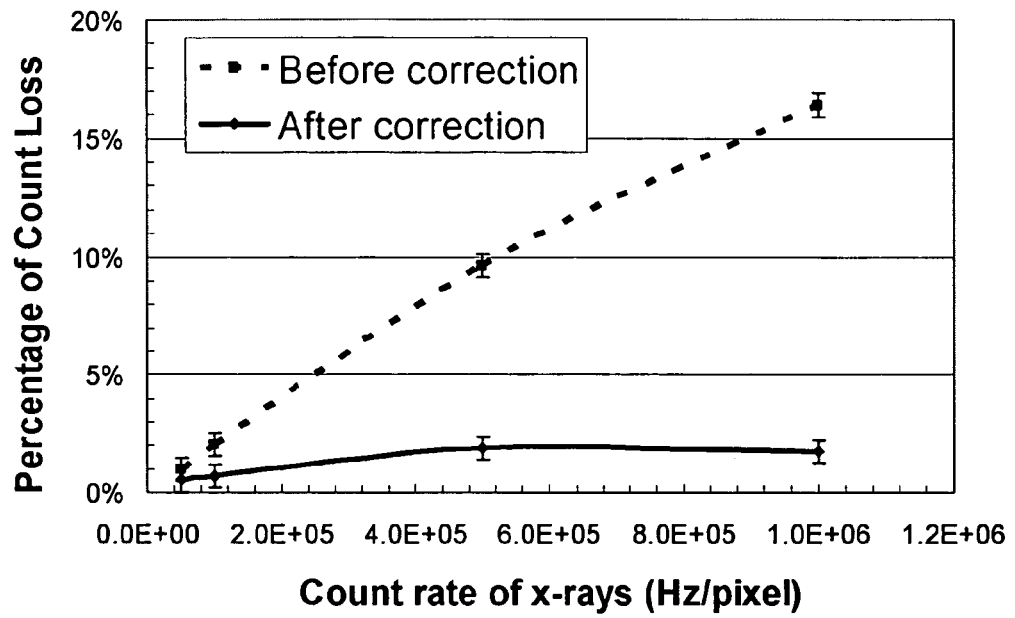
FIG. 10 is a graph showing a calculated detector response function.
Figure 11:
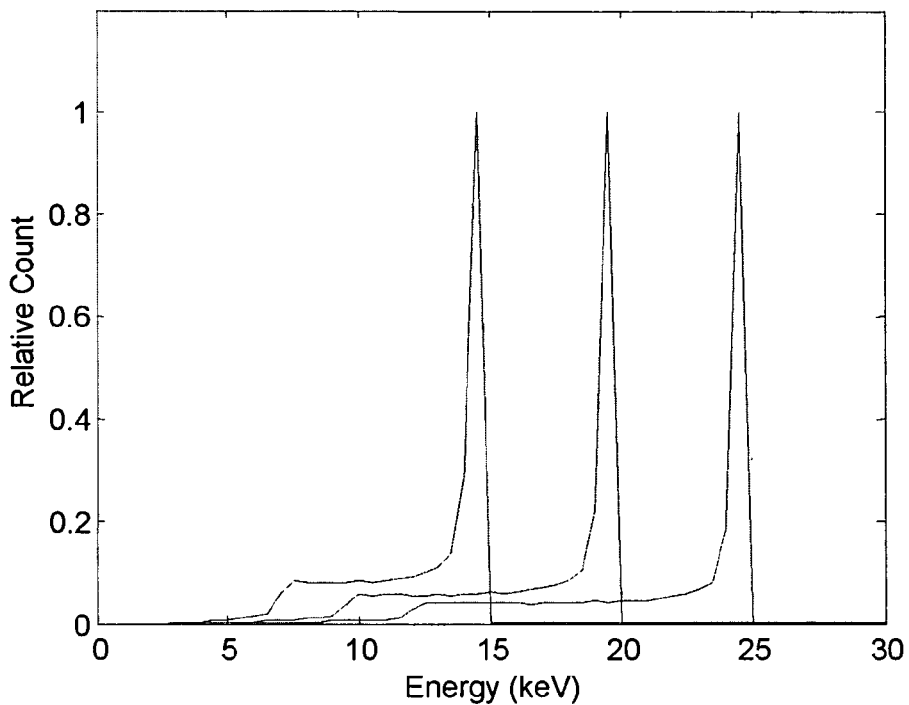
FIG. 11 is a graph showing an example of an uncorrected spectrum with 1 MHz/pixel, 100 micron pixel pitch, and 110 ns dead time.

A detector response function calculated using the simulation, without taking into account K x-rays & scattering is shown in FIG. 10.

Figure 12:
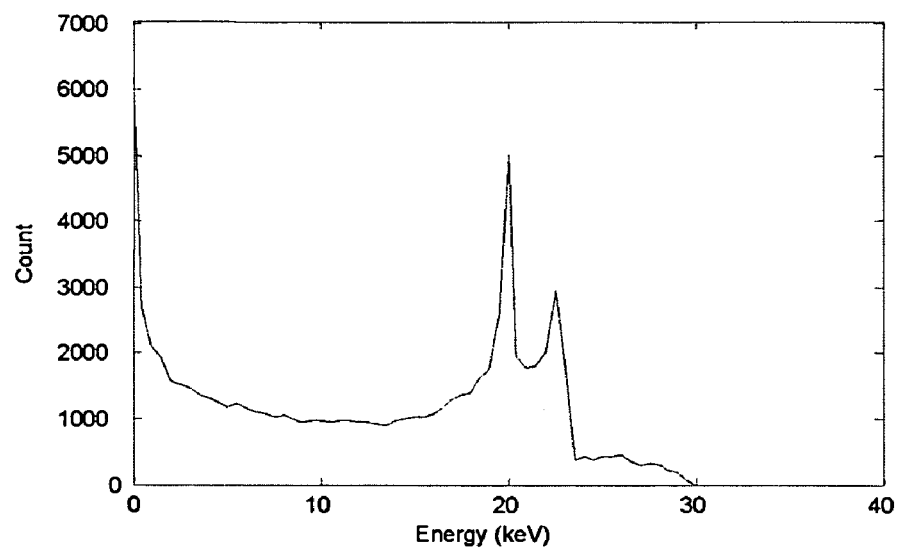
FIG. 12 is a graph showing a corrected spectrum and the original spectrum corresponding to the uncorrected spectrum of FIG. 11.

Spectrum Reconstruction Using Pseudoinverse Response Matrix is achieved from $f_2(E_i)$ (shown in the graph of FIG. 12) by correcting for count loss to obtain a new spectrum written $$\tilde{f}_1(E_i) = \frac{1}{1 - m\tau} f_2(E_i).$$

Figure 13:
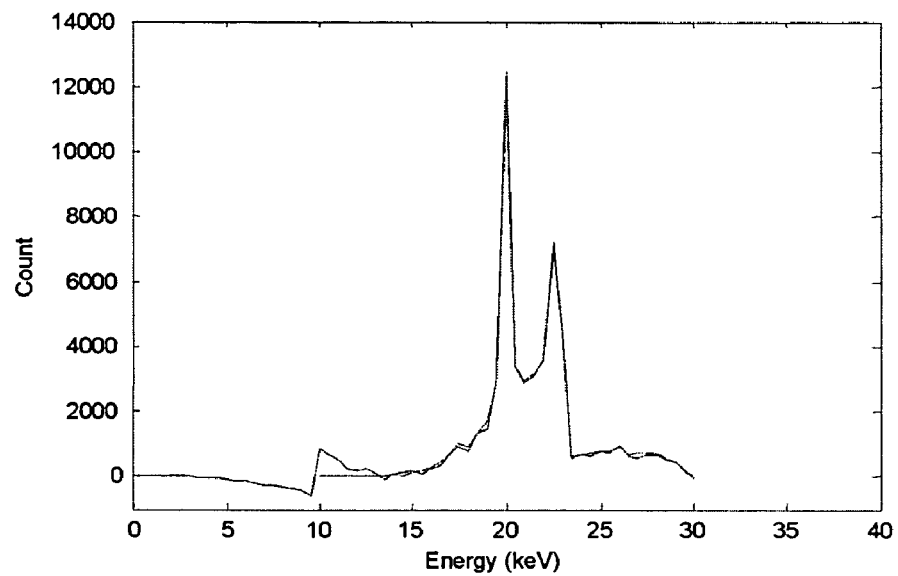
FIG. 13 is a graph showing components truncated to produce an inverse response matrix applied to obtain the spectrum.

Next, components below 10 keV are truncated to produce $\tilde{f}_{1t}(E_i)$, and an inverse response matrix is applied to obtain the spectrum. $\tilde{f}_0(E_i) = \tilde{f}_{1t}(E_j) \cdot \tilde{H}^{-1}(E_j, E_i)$, which is represented by the solid line of FIG. 13. (The dashed line in FIG. 13 represents $f_0(E_i)$.)

Reconstruction using Expectation Maximization (EM) Algorithm is performed in some configurations of the present invention to iteratively generate $$\tilde{f}_0^{(j+1)} = \frac{\tilde{f}_0^{(j)}}{s} \cdot \left[ H^T \cdot \frac{\tilde{f}_{1t}}{H \cdot \tilde{f}_0^{(j)}} \right].$$

This iterative procedure converges on a maximum-likelihood solution, and was developed specifically for data sets sampled from a Poisson distribution. This solution method features positivity as an advantage, i.e., if the initial estimate is positive, all subsequent estimates will remain non-negative. Also, zero values in the estimate remain zero. However, there may be no explicit criteria to stop the iteration, and computation can be time consuming.

Figure 1:
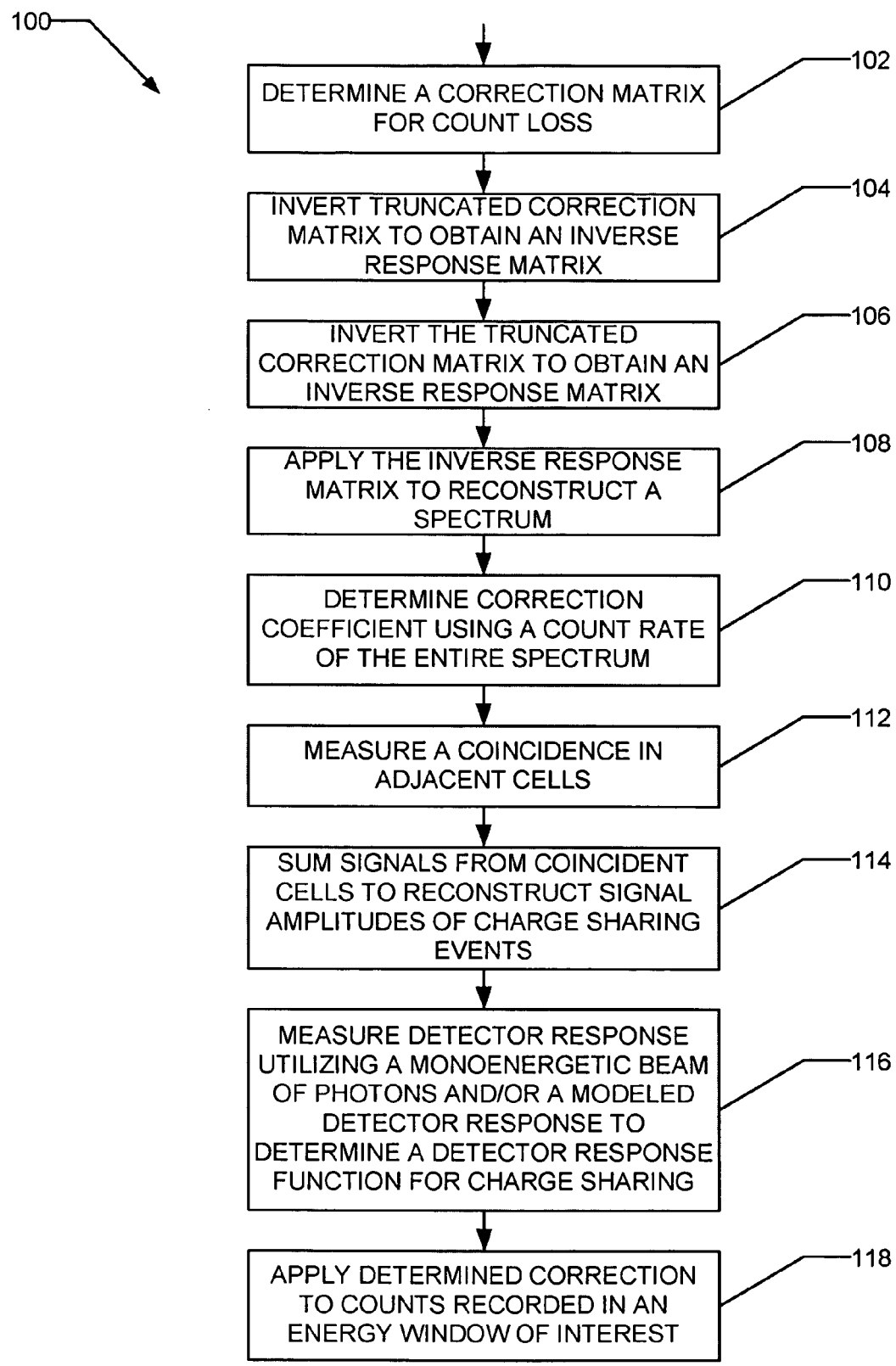
FIG. 1 is a flow chart representative of a method configuration of the present invention.

Thus, in some configurations of the present invention and referring to flow chart 100 of FIG. 1, a method for correcting at least one of pileup effects or charge sharing effects in multi-cell photon counting detectors is provided. This method includes at least the steps of determining 110 a correction coefficient using a count rate of an entire spectrum, and applying 118 the determined correction to the counts recorded in an energy window of interest. Some configurations also include measuring 112 a coincidence in adjacent cells and reconstructing 114 signal amplitudes of charge sharing events. In some configurations, the reconstruction includes summing signals from the coincident cells. Also, in some configurations, the method further includes determining 116 a detector response function for charge sharing. Determining a detector response function, in some configurations, includes measuring detector response utilizing a monoenergetic beam of photons, modeling the response of the detector, or a combination of both. In addition, in some configurations, the method further includes determining 102 a correction matrix for count loss, truncating 104 components of the correction matrix below a predetermined energy level to obtain a truncated correction matrix, inverting 106 the truncated correction matrix to obtain an inverse response matrix, and applying 108 the inverse response matrix to reconstruct a spectrum.

Any of the various configurations described above can be used in conjunction with a mammography imaging apparatus to image a human breast.

Figure 2:
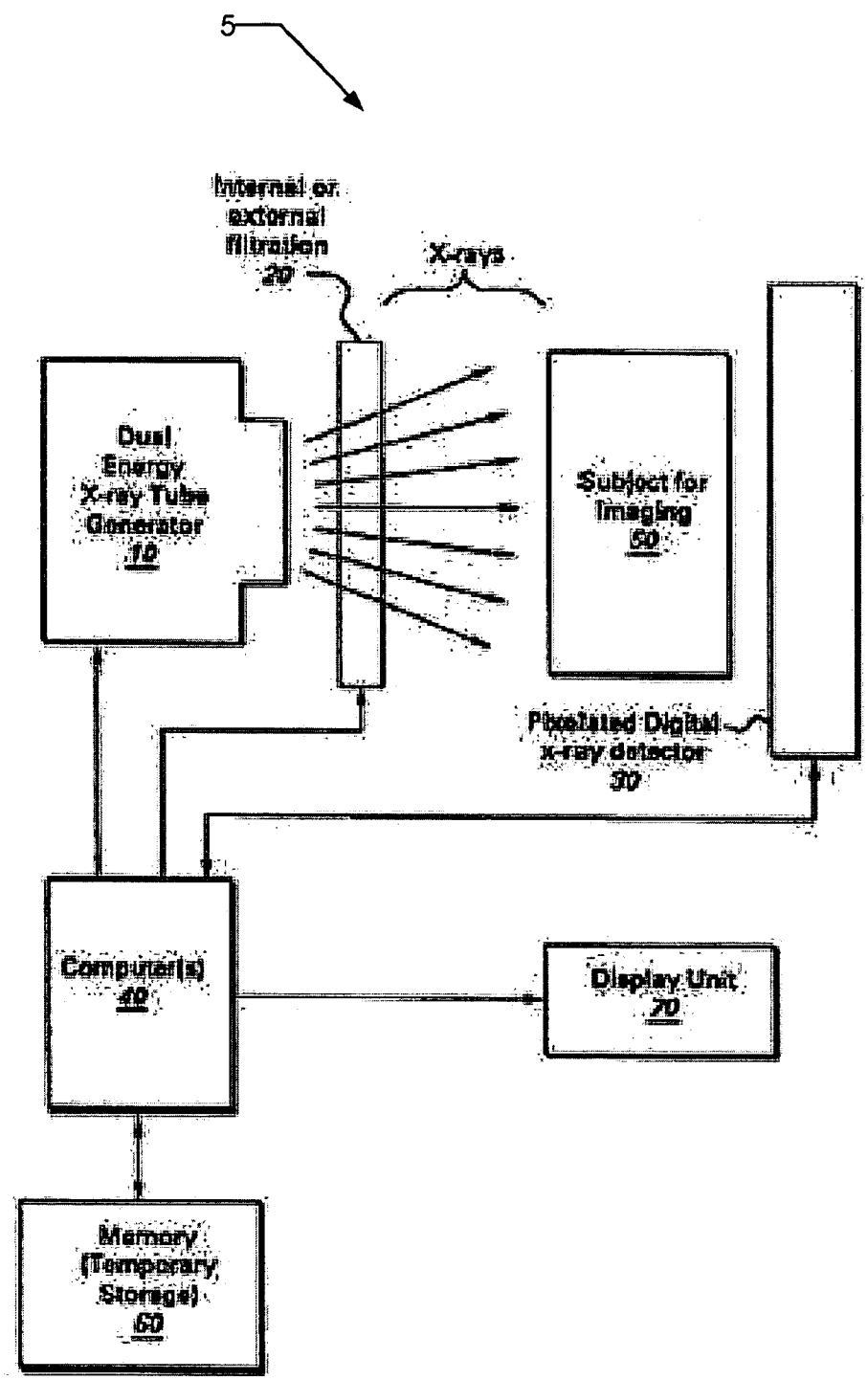
FIG. 2 is a block diagram representative of an apparatus configuration of the present invention.

Referring to FIGS. 1 and 2, some configurations of the present invention provide an apparatus 5 for correcting at least one of pileup effects or charge sharing effects in multi-cell photon counting detectors 30. Apparatus 5 includes a computer or computers 40, a display unit 70, and memory, such as temporary storage memory 60, which may also include removable storage such as one or more floppy diskettes, hard disks, CD-ROMs, CD-RWs, DVDs of various types, flash memory, etc. In some configurations, apparatus 5 is a mammography apparatus, and includes at least one x-ray tube generator 10 and an x-ray detector 30. Filtration 20 may be provided, and a subject 50 for imaging, which may be a human breast, is interposed between x-ray tube 10 and detector 30 for imaging.

Apparatus 5 is configured, such as by a stored program in memory 60, at least to determine 110 a correction coefficient using a count rate of an entire spectrum, and apply 118 the determined correction to the counts recorded in an energy window of interest. In some of these configurations, apparatus 5 is also configured to measure 112 a coincidence in adjacent cells, and to reconstruct 114 signal amplitudes of charge sharing events. To reconstruct signal amplitudes of charge sharing events, apparatus 5 is further configured in some configurations to sum signals from the coincident cells.

Apparatus 5 is also configured, in some configurations, to determine 116 a detector response function for charge sharing. To determine a detector response function, the apparatus, in some of these configurations, is further configured to measure detector response utilizing a monoenergetic beam of photons.

Apparatus 5 is also configured, in some configurations, to determine 102 a correction matrix for count loss, truncate 104 components of the correction matrix below a predetermined energy level to obtain a truncated correction matrix, invert 106 the truncated correction matrix to obtain an inverse response matrix, and apply 108 the inverse response matrix to reconstruct a spectrum.

In some of the above apparatus configurations, apparatus 5 is a mammography imaging apparatus.

It will thus be apparent that configurations of the present invention can correct for distortion in x-ray images resulting from either or both of pileup effects or charge sharing effects in multi-cell photon counting detectors.

While the invention has been described in terms of various specific embodiments, those skilled in the art will recognize that the invention can be practiced with modification within the spirit and scope of the claims.

What is claimed is:

1. A method for correcting at least one of pileup effects or charge sharing effects in multi-cell photon counting detectors, said method comprising:
   determining a correction coefficient using a count rate of an entire spectrum; and
   applying the determined correction to the counts recorded in an energy window of interest.

2. A method in accordance with claim 1 further comprising measuring a coincidence in adjacent cells, and reconstructing signal amplitudes of charge sharing events.

3. A method in accordance with claim 2 wherein said reconstruction further comprises summing signals from the coincident cells.

4. A method in accordance with claim 1 further comprising determining a detector response function for charge sharing.

5. A method in accordance with claim 4 wherein said determining a detector response function further comprises measuring detector response utilizing a monoenergetic beam of photons.

6. A method in accordance with claim 4 wherein said determining a detector response function further comprises modeling the response of the detector.

7. A method in accordance with claim 4 wherein said determining a detector response function further comprises a combination of measuring detector response utilizing a monoenergetic beam of photons and modeling the response of the detector.

8. A method in accordance with claim 1 further comprising:
   determining a correction matrix for count loss;
   truncating components of the correction matrix below a predetermined energy level to obtain a truncated correction matrix;
   inverting the truncated correction matrix to obtain an inverse response matrix; and
   applying the inverse response matrix to reconstruct a spectrum.

9. A method in accordance with claim 8 performed using a mammography imaging apparatus to image a human breast.

10. A method in accordance with claim 1 performed using a mammography imaging apparatus to image a human breast.

11. An apparatus for correcting at least one of pileup effects or charge sharing effects in multi-cell photon counting detectors, said apparatus configured to:
   determine a correction coefficient using a count rate of an entire spectrum; and
   apply the determined correction to the counts recorded in an energy window of interest.

12. An apparatus in accordance with claim 11 further configured to measure a coincidence in adjacent cells, and to reconstruct signal amplitudes of charge sharing events.

13. An apparatus in accordance with claim 12 wherein to reconstruct signal amplitudes of charge sharing events, said apparatus further configured to sum signals from the coincident cells.

14. An apparatus in accordance with claim 11 further configured to determine a detector response function for charge sharing.

15. An apparatus in accordance with claim 14 wherein to determine a detector response function, said apparatus further configured to measure detector response utilizing a monoenergetic beam of photons.

16. An apparatus in accordance with claim 11 further configured to:
   determine a correction matrix for count loss;
   truncate components of the correction matrix below a predetermined energy level to obtain a truncated correction matrix;
   invert the truncated correction matrix to obtain an inverse response matrix; and
   apply the inverse response matrix to reconstruct a spectrum.

17. An apparatus in accordance with claim 16 wherein the apparatus is a mammography imaging apparatus.

18. An apparatus in accordance with claim 11 wherein the apparatus is a mammography imaging apparatus.

* * * * *